United States Patent
Tanaka et al.

(10) Patent No.: US 9,311,946 B2
(45) Date of Patent: Apr. 12, 2016

(54) MAGNETIC RECORDING MEDIUM

(75) Inventors: Kenji Tanaka, Osaka (JP); Masao Fujita, Osaka (JP); Sadamu Kuse, Osaka (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 66 days.

(21) Appl. No.: 13/211,051

(22) Filed: Aug. 16, 2011

(65) Prior Publication Data

US 2012/0045664 A1 Feb. 23, 2012

(30) Foreign Application Priority Data

Aug. 17, 2010 (JP) .................................. 2010-182373

(51) Int. Cl.
  *G11B 5/71* (2006.01)
  *G11B 5/714* (2006.01)
  *G11B 5/738* (2006.01)

(52) U.S. Cl.
  CPC *G11B 5/71* (2013.01); *G11B 5/714* (2013.01); *G11B 5/738* (2013.01)

(58) Field of Classification Search
  None
  See application file for complete search history.

(56) References Cited

U.S. PATENT DOCUMENTS

| | | | |
|---|---|---|---|
| 7,485,379 B2 | 2/2009 | Hayakawa et al. | |
| 7,564,640 B2 | 7/2009 | Kitahara | |
| 7,981,310 B2 | 7/2011 | Nakiri et al. | |
| 2003/0157372 A1 | 8/2003 | Ozawa et al. | |
| 2004/0023067 A1* | 2/2004 | Kitamura et al. | 428/694 R |
| 2005/0181240 A1* | 8/2005 | Ishiyama et al. | 428/835.2 |
| 2006/0019123 A1 | 1/2006 | Hayakawa et al. | |
| 2007/0111040 A1* | 5/2007 | Yoshimura et al. | 428/844.2 |
| 2007/0231611 A1* | 10/2007 | Masaki | 428/840.2 |

(Continued)

FOREIGN PATENT DOCUMENTS

| | | |
|---|---|---|
| JP | 4-42425 A | 2/1992 |
| JP | 9-69224 A | 3/1997 |

(Continued)

OTHER PUBLICATIONS

Japanese Office Action dated Nov. 8, 2011, for Japanese Application No. 2010-182373.

(Continued)

*Primary Examiner* — Mark Ruthkosky
*Assistant Examiner* — Linda Chau
(74) *Attorney, Agent, or Firm* — Birch, Stewart, Kolasch & Birch, LLP

(57) ABSTRACT

A magnetic recording medium of the present invention is a magnetic recording medium including a non-magnetic substrate; a non-magnetic layer that is formed on one of principal surfaces of the non-magnetic substrate and contains a non-magnetic powder, a binder, and a lubricant; and a magnetic layer that is formed on a principal surface of the non-magnetic layer opposite to the non-magnetic substrate and contains a magnetic powder and a binder. The magnetic powder has an average particle size between 10 nm and 35 nm inclusive. The lubricant is migratable to the magnetic layer and forms a lubricant layer on a surface of the magnetic layer when a pressure is applied to the magnetic layer. When spacing of the surface of the magnetic layer before and after washing the lubricant with n-hexane is measured with a TSA (Tape Spacing Analyzer), the value of the spacing after washing is 3 to 10 nm, and the value of the spacing before washing is 1 to 5 nm smaller than the value of the spacing after washing.

13 Claims, 4 Drawing Sheets

(56) References Cited

U.S. PATENT DOCUMENTS

| | | |
|---|---|---|
| 2008/0220291 A1 | 9/2008 | Nakiri et al. |
| 2008/0253017 A1 | 10/2008 | Kitahara |

FOREIGN PATENT DOCUMENTS

| | | |
|---|---|---|
| JP | 2003-132516 A | 5/2003 |
| JP | 2005-146187 A | 6/2005 |
| JP | 2006-40334 A | 2/2006 |
| JP | 2006-107627 A | 4/2006 |
| JP | 2006-127666 A | 5/2006 |
| JP | 2008-248238 A | 10/2008 |
| JP | 2008-262645 A | 10/2008 |
| JP | 2009-230779 A | 10/2009 |
| JP | 2010-192065 A | 9/2010 |

OTHER PUBLICATIONS

Japanese Office Action dated Nov. 8, 2011, for Japanese Application No. 2010-182373 with English translation.

* cited by examiner

MAGNETIC RECORDING MEDIUM

BACKGROUND OF THE INVENTION

1. Field of the Invention

The present invention relates to a high-capacity magnetic recording medium, and particularly relates to a magnetic recording medium having superior recording/reproducing characteristics and transport characteristics.

2. Description of the Related Art

Magnetic tapes, which are a type of magnetic recording media, have various applications such as audiotape, videotape, and computer tapes. In particular, in the field of computer data backup tapes, with the increase in the capacity of hard disks to be backed up, tapes having a recording capacity as large as several hundred GB per reel have been put on the market. In the future, in order to support further increases in the capacity of hard disks, it is essential to increase the capacity of such data backup tapes.

With regard to a magnetic tape for use as a data backup tape, the recording wavelength has been shortened with the further increase in the recording capacity, and in order to suppress deterioration in the recording/reproducing characteristics depending on the spacing between a magnetic head and the magnetic tape, the surface of the magnetic layer has become increasingly smoothed. The smoothed surface of the magnetic tape results in an increase in the contact area between the magnetic head and the magnetic tape, and thus the friction between the head and the tape increases.

Moreover, in such a magnetic tape whose magnetic layer has a smoothed surface, repeated transport caused the surface of the magnetic layer to be further smoothed due to sliding against the magnetic head. Thus, the coefficient of friction increased or sticking tended to occur, resulting in unstable transport, or in extreme cases, the magnetic tape might be cut, or the magnetic head might be damaged.

To address such issues, for example, JP 2006-127666A proposes a method of avoiding sticking of a magnetic tape to a magnetic head by forming minute recesses in a BOT part (BOT: beginning of tape) and an EOT part (EOT: end of tape) of the magnetic tape that are particularly likely to stick to the magnetic head. Moreover, JP 2008-262645A proposes a method of avoiding sticking of a magnetic tape to a magnetic head by vibrating the magnetic head when starting or stopping transport during recording/reproduction of the magnetic tape.

However, both of the technologies disclosed in JP 2006-127666A and JP 2008-262645A propose the avoidance of sticking of the magnetic tape at the specific positions of the magnetic tape or when the magnetic tape is in the specific states, and do not propose a countermeasure to an increase in the coefficient of friction or sticking at other positions or in other states.

As a magnetic recording medium that solves the problems as described above, for example, JP 9-69224A proposes a magnetic recording medium in which a magnetic layer has a surface roughness of 5 nm or less, a lubricant portion accounts for 20 to 60% of the surface of the magnetic layer, and the lubricant portion has an average thickness of 1 to 10 nm. Moreover, JP 2003-132516A proposes a magnetic recording medium in which a magnetic layer has a surface lubricant index within a range of 1.3 to 5.0 and a center surface average roughness (i.e., surface roughness) of a 40 µm×40 µm area as measured by an atomic force microscope (AFM) is 4 nm or less.

The magnetic recording medium proposed in JP 9-69224A is a single-layer magnetic disk in which a magnetic layer having a thickness of 1 µm is formed on a substrate, and it is disclosed that the surface roughness of the magnetic layer can be set to 5 nm or less in order to achieve sufficient durability. However, in all the embodiments disclosed in JP 9-69224A, the magnetic layer has a surface roughness of 2 nm or more, and it is demanded to reduce the surface roughness further in order to improve the recording/reproducing characteristics even more.

Moreover, with regard to the magnetic recording medium proposed in JP 2003-132516A, even though the surface lubricant index determined by Auger electron spectroscopy corresponds to the amount of lubricant in the surface, it is not the thickness itself of a lubricant layer. Moreover, JP 2003-132516A discloses that in order to suppress the occurrence of noises, the surface roughness of the magnetic layer should be set to 4 nm or less and more preferably 3 nm or less. However, in all the embodiments disclosed in JP 2003-132516A, the magnetic layer has a surface roughness of 2.1 nm or more, and it is demanded to reduce the surface roughness further in order to improve the recording/reproducing characteristics even more.

SUMMARY OF THE INVENTION

A magnetic recording medium according to the present invention is a magnetic recording medium including a non-magnetic substrate; a non-magnetic layer that is formed on one of principal surfaces of the non-magnetic substrate and contains a non-magnetic powder, a binder, and a lubricant; and a magnetic layer that is formed on a principal surface of the non-magnetic layer opposite to the non-magnetic substrate and contains a magnetic powder and a binder, wherein the magnetic powder has an average particle size between 10 nm and 35 nm inclusive, the lubricant is migratable to the magnetic layer and forms a lubricant layer on a surface of the magnetic layer when a pressure is applied to the magnetic layer, and when spacing of the surface of the magnetic layer before and after washing the lubricant with n-hexane is measured with a TSA (Tape Spacing Analyzer), the value of the spacing after washing is 3 to 10 nm, and the value of the spacing before washing is 1 to 5 nm smaller than the value of the spacing after washing.

According to the magnetic recording medium of the present invention, since the surface profile and the lubricant layer thickness of the magnetic recording medium are controlled so as to fall within preferable ranges, it is possible to provide a magnetic recording medium whose magnetic layer has an extremely smooth surface and that has superior recording/reproducing characteristics and transport characteristics.

DESCRIPTION OF THE PREFERRED EMBODIMENTS

A magnetic recording medium according to the present invention is a magnetic recording medium including a non-magnetic substrate; a non-magnetic layer that is formed on one of principal surfaces of the non-magnetic substrate and contains a non-magnetic powder, a binder, and a lubricant; and a magnetic layer that is formed on a principal surface of the non-magnetic layer opposite to the non-magnetic substrate and contains a magnetic powder and a binder, wherein the magnetic powder has an average particle size between 10 nm and 35 nm inclusive, the lubricant is migratable to the magnetic layer and forms a lubricant layer on a surface of the magnetic layer when a pressure is applied to the magnetic layer, and when spacing of the surface of the magnetic layer before and after washing the lubricant with n-hexane is measured with a TSA (Tape Spacing Analyzer), the value of the spacing after washing is 3 to 10 nm, and the value of the spacing before washing is 1 to 5 nm smaller than the value of the spacing after washing. Thus, it is possible to provide a magnetic recording medium whose magnetic layer has an extremely smooth surface and that has superior recording/reproducing characteristics and transport characteristics.

Figure 1:
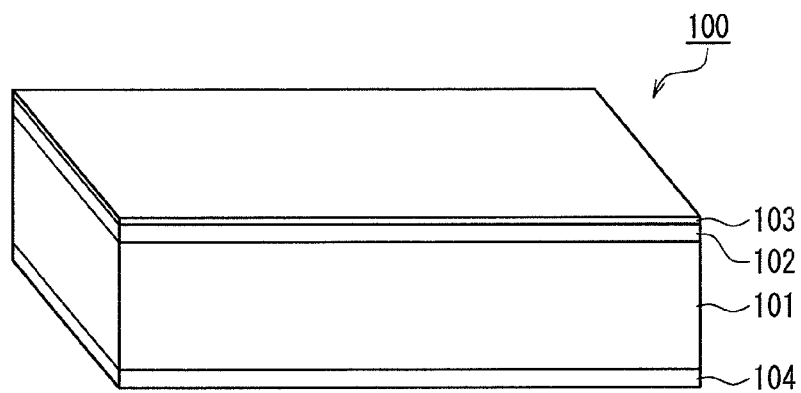
FIG. 1 is a schematic configuration diagram showing an example of a magnetic recording medium of the present invention.

An example of the magnetic recording medium according to the present invention will be described using FIG. 1. FIG. 1 is a schematic configuration diagram showing an example of the magnetic recording medium according to the present invention.

A magnetic recording medium 100 shown in FIG. 1 is a magnetic tape having a non-magnetic substrate 101, a non-magnetic layer 102 formed on one principal surface (here, an upper surface) of the non-magnetic substrate 101, and a magnetic layer 103 formed on a principal surface (here, an upper surface) of the non-magnetic layer 102 opposite to the non-magnetic substrate 101. Moreover, a backcoat layer 104 is formed on a principal surface (here, a lower surface) of the non-magnetic substrate 101 on which the non-magnetic layer 102 is not formed. It should be noted that the backcoat layer is not necessarily required and may be omitted.

Non-Magnetic Layer

The non-magnetic layer 102 contains a non-magnetic powder, a binder, and a lubricant.

Examples of the non-magnetic powder contained in the non-magnetic layer 102 include carbon black, titanium oxide, iron oxide, and aluminum oxide. Usually, carbon black is used alone, or carbon black is mixed with another non-magnetic powder such as titanium oxide, iron oxide, or aluminum oxide and the mixture is used. In order to form a coating having little unevenness in thickness to form the smooth non-magnetic layer 102, it is preferable to use a non-magnetic powder having a sharp particle size distribution. The average particle size of the non-magnetic powder is, for example, preferably 10 to 1000 nm and more preferably 10 to 500 nm from the standpoint of ensuring the uniformity, surface smoothness, and rigidity of the non-magnetic layer 102 and ensuring the conductivity.

The particle shape of the non-magnetic powder contained in the non-magnetic layer 102 may be any of spherical, plate-like, needle-like, and spindle-like shapes. With regard to the average particle size of a needle-like or spindle-like non-magnetic powder, the average major axis diameter is preferably 10 to 300 nm, and the average minor axis diameter is preferably 5 to 200 nm. The average particle size of a spherical non-magnetic powder is preferably 5 to 200 nm and more preferably 5 to 100 nm. The average particle size of a plate-like non-magnetic powder is preferably 10 to 200 nm in terms of the largest plate diameter. Furthermore, in order to form the non-magnetic layer 102 that is smooth and has little unevenness in thickness, a non-magnetic powder having a sharp particle size distribution is preferably used. It should be noted that "average particle size of a powder" as used herein means a number-average value of the particle size of 300 particles in a photograph of the powder taken by a transmission electron microscope (TEM).

It is possible to use conventional thermoplastic resin, thermosetting resin, and the like as the binder contained in the non-magnetic layer 102. Specific examples of the thermoplastic resin include a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, and a vinyl chloride-hydroxyl group-containing alkyl acrylate copolymer resin. Specific examples of the thermosetting resin include a phenolic resin, an epoxy resin, a polyurethane resin, a urea resin, a melamine resin, and an alkyd resin. Among these binders, those having a functional group are preferable in order to improve the dispersibility of the non-magnetic powder and increase the filling properties. Specific examples of such a functional group include COOM, $SO_3M$, $OSO_3M$, $P=O(OM)_3$, $O-P=O(OM)_2$ (M is a hydrogen atom, an alkali metal salt, or an amine salt), OH, NR1R2, NR3R4R5 (R1, R2, R3, R4, and R5 represent hydrogen or a hydrocarbon group, which usually has 1 to 10 carbon atoms), and an epoxy group. In the case where two or more types of resins are used in combination, it is preferable to use resins whose functional groups have the same polarity, and, among others, a combination of resins having an $SO_3M$ group is preferable. The content of these binders is preferably 7 to 50 parts by mass and more preferably 10 to 35 parts by mass with respect to 100 parts by mass of the non-magnetic powder. In particular, it is preferable to use 5 to 30 parts by mass of a vinyl chloride resin and 2 to 20 parts by mass of a polyurethane resin in combination.

Moreover, a radiation curable resin may be used as the binder instead of or in combination with a thermosetting resin such as described above. Examples of the radiation curable resin include a (meth)acrylic monomer and a (meth)acrylic oligomer. Among these, a radiation curable resin having two or more double bonds in each molecule and having a weight-average molecular weight of 50 to 300 per double bond is preferable. Specific examples of such a radiation curable resin include bifunctional (meth)acrylates such as 1,3-butanediol di(meth)acrylate, 1,4-butanediol di(meth)acrylate, 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, ethoxylated bisphenol A di(meth)acrylate, novolac di(meth)acrylate, and propoxylated neopentyl glycol di(meth)acrylate; trifunctional (meth) acrylates such as tris(2-hydroxyethyl) isocyanurate tri(meth) acrylate, trimethylolpropane tri(meth)acrylate, ethoxylated trimethylolpropane tri(meth)acrylate, pentaerythritol tri (meth)acrylate, propoxylated trimethylolpropane tri(meth) acrylate, propoxylated glyceryl tri(meth)acrylate, caprolactone modified trimethylolpropane tri(meth)acrylate; tetrafunctional or higher functional (meth)acrylates such as pentaerythritol tetra(meth)acrylate, ditrimethylolpropane tetra(meth)acrylate, ethoxylated pentaerythritol tetra(meth) acrylate, dipentaerythritol hydroxy penta(meth)acrylate, and dipentaerythritol hexa(meth)acrylate; and oligomers obtained by performing molecular chain extension of the above-described monomers with, for example, a polyether, polyester, polycarbonate, or polyurethane backbone. The content of the radiation curable resin in the non-magnetic layer 102 is preferably 5 to 30 wt % with respect to the combined amount of any other binder and the radiation curable resin.

Moreover, it is preferable to use, along with the above-described binder, a thermosetting crosslinking agent that binds to the functional group or the like contained in the binder and forms a crosslinking structure. Specific examples of the crosslinking agent include isocyanate compounds such as tolylene diisocyanate, hexamethylene diisocyanate, and isophorone diisocyanate; reaction products of an isocyanate compound and a compound, such as trimethylolpropane, having a plurality of hydroxyl groups; and various types of polyisocyanate such as a condensation product of an isocyanate compound. The content of the crosslinking agent is preferably 10 to 50 parts by mass with respect to 100 parts by mass of the binder.

Examples of the lubricant contained in the non-magnetic layer 102 include a conventional fatty acid having 10 to 30 carbon atoms. Although the fatty acid may be any of a straight-chain fatty acid, a branched-chain fatty acid, and a cis-trans isomer, a straight-chain fatty acid, which has excellent lubricating ability, is preferable. Specific examples of such a fatty acid include lauric acid, myristic acid, stearic acid, palmitic acid, behenic acid, oleic acid, and linoleic acid. These fatty acids may be used alone or in combination of two or more. The content of the fatty acid in the non-magnetic layer 102 is preferably 0.2 to 5 parts by mass with respect to 100 parts by mass of the non-magnetic powder. A fatty acid content of 0.2 parts by mass or more can cause the fatty acid to sufficiently seep from the non-magnetic layer 102 into the magnetic layer 103, and therefore can improve the long durability in a low-humidity environment even more. A fatty acid content of 5 parts by mass or less can ensure the toughness of the non-magnetic layer 102.

Furthermore, the non-magnetic layer 102 may contain, along with the above-described fatty acid, a conventional fatty acid ester or fatty acid amide as the lubricant. Specific examples of the fatty acid ester include n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the fatty acid amide include palmitic acid amide and stearic acid amide. These fatty acid esters and fatty acid amides may be used alone or in combination of two or more. The combined content of the fatty acid ester and the fatty acid amide in the non-magnetic layer 102 is preferably 0.2 to 10 parts by mass with respect to 100 parts by mass of the non-magnetic powder. A fatty acid ester and fatty acid amide content of 0.2 parts by mass or more can cause the lubricant to sufficiently seep from the non-magnetic layer 102 into the magnetic layer 103, which in turn can reduce the coefficient of friction even more. A lubricant content of 10 parts by mass or less can ensure the toughness of the non-magnetic layer 102. In particular, it is preferable that 0.5 to 4 parts by mass of fatty acid and 0.2 to 3 parts by mass of fatty acid ester are contained with respect to 100 parts by mass of the non-magnetic powder. A fatty acid content of less than 0.5 parts by mass will result in a decreased effect of reducing the coefficient of friction, and a fatty acid content exceeding 4 parts by mass will cause plasticization of the non-magnetic layer 102, which may lead to a loss of toughness. Moreover, a fatty acid ester content of less than 0.2 parts by mass will result in a decreased effect of reducing the coefficient of friction, and a fatty acid ester content exceeding 3 parts by mass will cause an excessive amount of lubricant to be introduced into the magnetic layer 103, and therefore, an adverse effect including, for example, sticking of the magnetic tape to the magnetic head may occur.

The non-magnetic layer 102 may further contain an additive such as a conventional dispersing agent, as long as it contains the non-magnetic powder, the binder, and the lubricant, which are described above. Specific examples of such a dispersing agent include a metallic soap composed of an alkali metal or an alkaline-earth metal of the above-described fatty acid; a fluorinated compound of the above-described fatty acid ester; a polyalkylene oxide alkylphosphate ester; lecithin; trialkylpolyolefinoxy quaternary ammonium salt (the alkyl has 1 to 5 carbon atoms, and the olefin is ethylene, propylene, or the like); and copper phthalocyanine. These dispersing agents may be used alone or in combination of two or more. The content of the dispersing agent is preferably 0.2 to 5 parts by mass with respect to 100 parts by mass of the non-magnetic powder.

The non-magnetic layer 102 preferably has a thickness of 0.1 to 3 µm and more preferably 0.1 to 1.2 µm. A thickness of the non-magnetic layer 102 of 0.1 µm or more will allow a sufficient amount of lubricant to ensure durability to be contained n the non-magnetic layer 102. On the other hand, a thickness of the non-magnetic layer 102 of 3 µm or less will make it possible to avoid an unnecessary increase in the overall thickness of the magnetic recording medium, and therefore it is possible to improve recording capacity per unit volume.

Magnetic Layer

The magnetic layer 103 contains a magnetic powder and a binder.

Specific examples of the magnetic powder contained in the magnetic layer 103 include hexagonal ferrite magnetic powder, ferromagnetic metallic iron magnetic powder, and iron nitride magnetic powder. The average particle size of the magnetic powder is preferably 10 to 35 nm and more preferably 15 to 25 nm. An average particle size of 10 nm or more will allow for preparation of a magnetic paint having excellent dispersibility. On the other hand, an average particle size of 35 nm or less can reduce particle noise. It should be noted that, the "average particle size" of a magnetic powder refers to an average major axis diameter in the case of a needle-like magnetic powder, the largest plate diameter in the case of a plate-like magnetic powder, or the largest diameter in the case of a spherical or ellipsoidal magnetic powder having a ratio of the major axis length to the minor axis length within a range of 1 to 3.5.

It is possible to use conventional binders as the binder contained in the magnetic layer 103. Among these, a binder similar to the binder for use in the non-magnetic layer 102 is preferable in light of the dispersibility of the magnetic powder and the rigidity of the magnetic layer 103. The content of the binder in the magnetic layer 103 is preferably 7 to 50 parts by mass and more preferably 10 to 35 parts by mass with respect to 100 parts by mass of the magnetic powder. In particular, in the case where a vinyl chloride resin and a polyurethane resin are used in combination, it is preferable to use 5 to 30 parts by mass of vinyl chloride resin and 2 to 20 parts by mass of polyurethane resin. Moreover, as in the case of the non-magnetic layer 102, in order to crosslink the binder to enhance the strength of the magnetic layer 103, it is preferable to use a crosslinking agent such as polyisocyanate. The content of the crosslinking agent is preferably 10 to 50 parts by mass with respect to 100 parts by mass of the binder.

The magnetic layer 103 may further contain additives including, for example, a polishing agent, a lubricant, and a dispersing agent, as long as it contains the magnetic powder and the binder, which are described above. In particular, a polishing agent and a lubricant are preferably used in light of the durability. Specific examples of the polishing agent include α-alumina, 6-alumina, silicon carbide, chromium oxide, ceric oxide, α-iron oxide, corundum, synthetic diamond, silicon nitride, silicon carbide, titanium carbide, titanium oxide, silicon dioxide, and boron nitride, and among these, a polishing agent having a Mohs' hardness of 6 or more is more preferable. These polishing agents may be used alone or in combination of two or more. The average particle size of the polishing agent is preferably 10 to 200 nm although it depends on the type of polishing agent used. The content of the polishing agent is preferably 2 to 20 parts by mass and more preferably 5 to 18 parts by mass with respect to 100 parts by mass of the magnetic powder. With regard to the lubricant, it is possible to use a lubricant similar to the lubricant for use in the non-magnetic layer 102. Among these, it is preferable to use a fatty acid ester and a fatty acid amide in combination. In particular, in the case where a lubricant is contained in the magnetic layer 103, it is preferable to use 0.2 to 3 parts by mass of fatty acid ester and 0.5 to 5 parts by mass of fatty acid amide with respect to the total amount, which is taken as 100 parts by mass, of all the powders, such as the magnetic powder and the polishing agent, in the magnetic layer 103. The reason for this is as follows. A fatty acid ester content of less than 0.2 parts by mass will result in a decreased effect of reducing the coefficient of friction, and a fatty acid ester content exceeding 3 parts by mass will lead to a risk of an adverse effect such as sticking of the magnetic layer 103 to the head. A fatty acid amide content of less than 0.5 parts by mass will result in a decreased effect of preventing seizing, which occurs due to contact between the magnetic head and the magnetic layer 103, and a fatty acid amide content exceeding 5 parts by mass will lead to a risk of bleeding of the fatty acid amide. It should be noted that the lubricant contained in magnetic layer 103 and the lubricant contained in the non-magnetic layer 102 are mutually migratable.

Moreover, the magnetic layer 103 may contain a conventional carbon black in order to improve the conductivity and the surface lubricity, if necessary. Specific examples of such a carbon black include acetylene black, furnace black, and thermal black. The carbon black preferably has an average particle size of 0.01 to 0.1 μm. An average particle size of 0.01 μm or more will allow for formation of the magnetic layer 103 in which the carbon black is well dispersed. On the other hand, an average particle size of 0.1 μm or less will allow for formation of the magnetic layer 103 that has excellent surface smoothness. Moreover, two or more types of carbon blacks having different average particle sizes may be used, if necessary. The content of the carbon black is preferably 0.2 to 5 parts by mass and more preferably 0.5 to 4 parts by mass with respect to 100 parts by mass of the magnetic powder.

In order to improve the short-wavelength recording characteristics, the magnetic layer 103 preferably has a thickness of 10 to 150 nm, more preferably 20 to 100 nm, and even more preferably 30 to 90 nm. As long as the magnetic layer 103 has the aforementioned thickness, a thickness loss during recording/reproduction due to the self-demagnetization effect can be reduced even in the case of short-wavelength recording. Thus, it is possible to achieve a high output even in a system whose shortest recording wavelength is 0.5 μm or less.

The product of the residual flux density of the magnetic layer 103 in a longitudinal direction and the thickness of the magnetic layer 103 is preferably 0.0018 to 0.05 μTm (0.14 to 4 m·emu/cm$^2$), more preferably 0.0036 to 0.05 μTm (0.29 to 4 m·emu/cm$^2$), and even more preferably 0.004 to 0.05 μTm (0.32 to 4 m·emu/cm$^2$). In the case where an MR head is used as the reproducing head, if the value of the above-described product is excessively small, the reproduced output will tend to decrease. On the other hand, if the value of the above-described product is excessively large, the MR head will be saturated, and the reproduced output will be likely to be distorted.

The "surface roughness" of the magnetic layer 103 refers to the centerline average roughness Ra defined in the Japanese Industrial Standard (JIS) B0601, and it is preferable that Ra is less than 2.0 nm. The more the surface smoothness of the magnetic layer 103 improves, the higher the output that can be obtained, but an excessively smoothed surface of the magnetic layer 103 will lead to an increase in the coefficient of friction, which in turn decreases the transport stability. Therefore, preferably, Ra is at least 1.0 nm.

Non-Magnetic Substrate

A conventionally used non-magnetic substrate for magnetic recording media can be used as the non-magnetic substrate 101. Specific examples of the non-magnetic substrate include plastic films composed of polyesters such as polyethylene terephthalate and polyethylene naphthalate, polyolefins, cellulose triacetate, polycarbonate, polyamide, polyimide, polyamide imide, polysulfone, and aramid.

The thickness of the non-magnetic substrate 101, which varies depending on the application, is preferably 1.5 to 11 μm and more preferably 2 to 7 μm. If the non-magnetic substrate 101 has a thickness of 1.5 μm or more, the film forming properties are improved, and a high strength can be achieved. On the other hand, if the non-magnetic substrate 101 has a thickness of 11 μm or less, an unnecessary increase in the overall thickness will be avoided, and, for example, in the case of a magnetic tape, the recording capacity per reel can be increased.

The Young's modulus of the non-magnetic substrate 101 in the longitudinal direction is preferably 5.8 GPa or more and more preferably 7.1 GPa or more. If the Young's modulus of the non-magnetic substrate 101 in the longitudinal direction is 5.8 GPa or more, the transport characteristics can be improved. Moreover, in the case of a magnetic recording medium for use in a helical scanning system, the ratio (MD/TD) of the Young's modulus (MD) in the longitudinal direction to the Young's modulus (TD) in a width direction is preferably within a range of 0.6 to 0.8, more preferably within a range of 0.65 to 0.75, and even more preferably 0.7. As long as this ratio falls within the above-described range, variations in the output of the magnetic head between an entrance side and an exit side of a track (flatness) can be suppressed. In the case of a magnetic recording medium for use in a linear recording system, the ratio (MD/TD) of the Young's modulus (MD) in the longitudinal direction to the Young's modulus (TD) in the width direction is preferably within a range of 0.7 to 1.3.

The temperature coefficient of expansion of the non-magnetic substrate 101 in the width direction is preferably −10 to 10×10$^{-6}$, and the humidity coefficient of expansion in the width direction is preferably 0 to 10×10$^{-6}$. As long as these coefficients fall within the above-described ranges, off-track errors due to a change in the temperature or the humidity can be suppressed, so that the error rate can be reduced.

Backcoat Layer

Preferably, in order to, for example, improve the transport characteristics, the backcoat layer 104 is provided on the principal surface (here, the lower surface) of the non-magnetic substrate 101 opposite to the principal surface on which the non-magnetic layer 102 is formed. The backcoat layer 104 preferably has a thickness of 0.2 to 0.8 μm and more preferably 0.3 to 0.8 μm. The reason for this is as follows. An excessively small thickness of the backcoat layer 104 will result in an insufficient effect of improving the transport characteristics, and an excessively large thickness will lead to an increase in the overall thickness of the magnetic tape, which in turn result in a decrease in the recording capacity per reel of magnetic tape.

Preferably, the backcoat layer 104 contains a carbon black including, for example, acetylene black, furnace black, or thermal black. Usually, a small particle size carbon black and a large particle size carbon black, which are relatively different in particle size, are used in combination. This is because the combined use will increase the effect of improving the transport characteristics.

Moreover, the backcoat layer 104 contains a binder, and binders similar to those for use in the non-magnetic layer 102 and the magnetic layer 103 can be used as the binder. Among these, it is preferable to use a cellulose resin and a polyurethane resin in combination in order to reduce the coefficient of friction and improve the transport characteristics with respect to the magnetic head.

Preferably, the backcoat layer 104 further contains iron oxide, alumina, or the like in order to improve the strength.

The backcoat layer 104 may be formed before or after the formation of the non-magnetic layer 102 and the magnetic layer 103.

Methods for improving the transport durability of the magnetic recording medium 100 having the above-described configuration are narrowed down to the following two methods: (A) decreasing the load applied to the magnetic recording medium (magnetic tape) due to transport and (B) increasing all types of strength of the magnetic tape itself so that the magnetic tape is not damaged even under a load. Specifically, it is common that the method (A) is performed by reducing the coefficient of friction between the surface of the magnetic tape and the magnetic head during transport. Moreover, as a result of various studies conducted by those engaged in the design of magnetic tapes in order to elucidate the relationship between the method (A) and the method (B), the following is known. As a result of a long period of transport or many times of transport, the surface of the magnetic tape becomes smoother and becomes similar to the mirror surface, and consequently, the contact area between the surface of the magnetic tape and the sliding surface of the head increases, resulting in an increase in the coefficient of friction with respect to the magnetic head, and thus, the likelihood of sticking increases. Accordingly, the load applied to the surface of the magnetic tape increases, causing a phenomenon in which the coating is ruined, or a phenomenon in which the head touch (tape/head contact) becomes unstable due to stick-slip, which is the phenomenon in which the transport speed jerks in an extremely short period of time, and thus the output fluctuates.

In order to prevent these phenomena, some contrivance to ensure the durability of the magnetic layer 103 has been performed by carefully selecting the components of the magnetic layer 103 so as to form minute protrusions on the surface of the magnetic layer 103 so that there are protruding portions on the surface, or by basically reducing the substantial contact area between the surface of the magnetic layer 103 and the magnetic head by performing smoothing of the surface with some contrivance. Moreover, it was found that a boundary lubrication layer (it substantially is the lubricant among the components of the tape that provides a boundary lubrication function, and so hereinafter the boundary lubrication layer may also be simply referred to as "lubricant layer") that is formed by the lubricant, which is added for the purpose of reducing the coefficient of friction against the magnetic head, between the magnetic head and the surface of the tape has a significant influence on the transport durability.

As the transport length or transport time of the magnetic tape increases, the protrusions on the surface of the magnetic layer 103 wear, and the contact area between the magnetic head and the surface of the magnetic layer 103 gradually increases. Moreover, with regard to the recent high-density, large-capacity magnetic tapes, even though an increased height of the protrusions results in a decrease in the contact area and alleviation of damage to the coating and therefore is preferable for improvement in the durability, the increased protrusion height increases the spacing loss and therefore is not desirable from the standpoint of maintenance of good electromagnetic conversion characteristics. Therefore, in order to prevent deterioration in the durability even when the surface of the magnetic layer 103 has become very smooth, the boundary lubrication layer has an important function. Therefore, measurement of not only the amount of the lubricant, which forms the boundary lubrication layer, on the surface of the tape but also the thickness itself of the boundary lubrication layer provides an effective guideline and is very important in designing a coating for improving the durability of the magnetic recording medium 100 by, for example, analyzing the relationship between the value of the measured thickness of the boundary lubrication layer and the results of an actual durability test.

Thus, the inventors of the present invention have already proposed a method for directly measuring the thickness of the lubricant layer formed on the surface of the magnetic layer 103 of the magnetic recording medium 100, as disclosed in JP 2010-192065A by the inventors of the present invention. Specifically, in this method, first, a transparent body is disposed in contact with and opposing the surface of the magnetic recording medium. The transparent body side of the magnetic recording medium is irradiated with light via the transparent body. Based on the intensity of coherent light generated in a portion where the surface of the magnetic recording medium and the transparent body are opposing each other, the spacing between the magnetic recording medium and the transparent body is calculated. This spacing measurement method is used to measure the thickness of the lubricant layer from the difference between the values of the spacing between the magnetic recording medium and the transparent body before and after the lubricant layer is washed away with an organic solvent.

In an embodiment of the present invention, a minute spacing between the surface of the magnetic layer of the magnetic recording medium 100 and a smooth glass plate or a glass dummy head assumed as a magnetic head is measured using a commercially available TSA (Tape Spacing Analyzer (manufactured by MicroPhysics, Inc.)). The TSA measures the distances between the surface of the glass plate and multiple points in a specified region of the surface of the magnetic tape that is in contact with the glass plate, based on the principle of optical interference, displays the measured distances in the form of a histogram, and determines the spacing between the glass plate and the magnetic recording medium based on the peak value (the mode).

Figure 2:
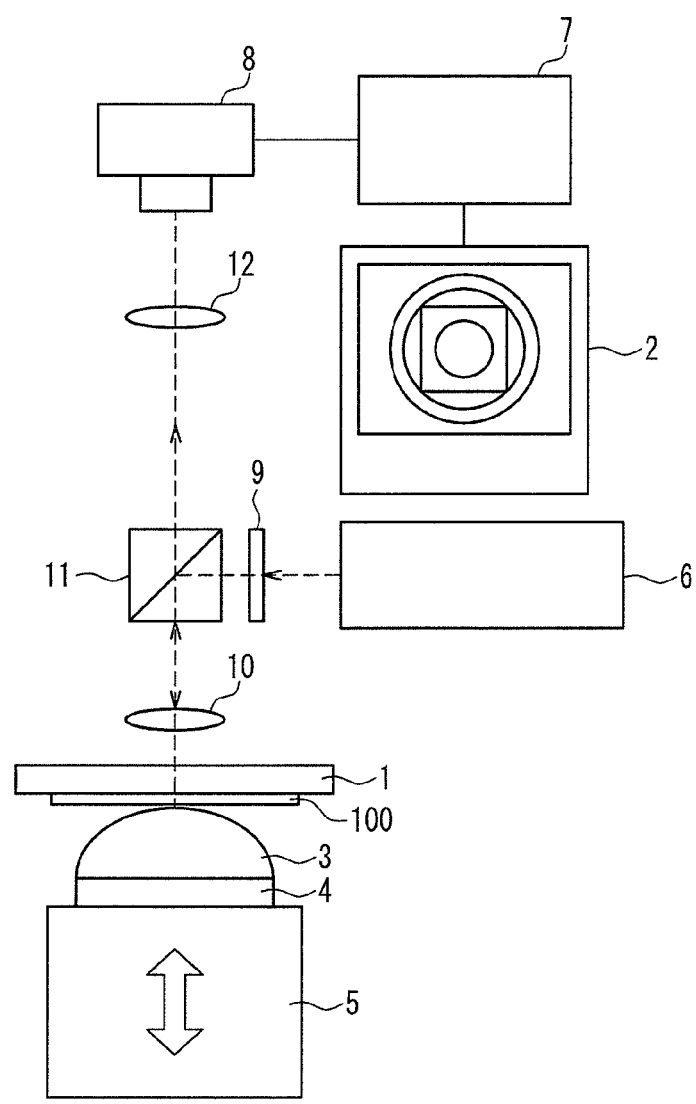
FIG. 2 is a schematic diagram of a spacing measurement apparatus.

Hereinafter, a method for measuring the spacing will be described in detail using FIG. 2. FIG. 2 is a diagram schematically showing a spacing measurement apparatus for measuring the spacing using a TSA.

First, a glass plate 1 is prepared. Here, the surface roughness of the glass plate 1 was measured using a three-dimensional surface structure analyzer (manufactured by Zygo Corporation, device name: New View 5000) by scanning white light interferometry with a scan length of 5 μm and a measurement field of view of 350 μm×280 μm. When Ra (nm) is an average surface roughness of the glass plate 1, P is a maximum value of step heights, V is a minimum value of the step heights, and P–V (nm) is the maximum roughness, Ra was 2.6 nm and P–V was 23.8 nm.

Then, the surface of the magnetic layer 103 (see FIG. 1) of the magnetic recording medium 100 is brought into close contact with the glass plate 1. A hemisphere 3 (diameter: 47.6 mm, hardness: estimated at Shore A 50°) made of urethane and mounted on a precision stage 5 via a load cell 4 is pressed against the backcoat layer 104 (see FIG. 1) side of the magnetic recording medium 100. That is to say, the surface of the magnetic layer 103 (see FIG. 1) of the magnetic recording medium 100 is pressed against the glass plate 1. The pressing pressure at this time is set equal to the head pressure the magnetic tape experiences in an actual drive. In the case of an LTO (Linear Tape Open) system, this pressure is 0.4 to 1.0 atm (4.05 to 10.1 ($\times 10^4$ N/m$^2$)).

Figure 3:
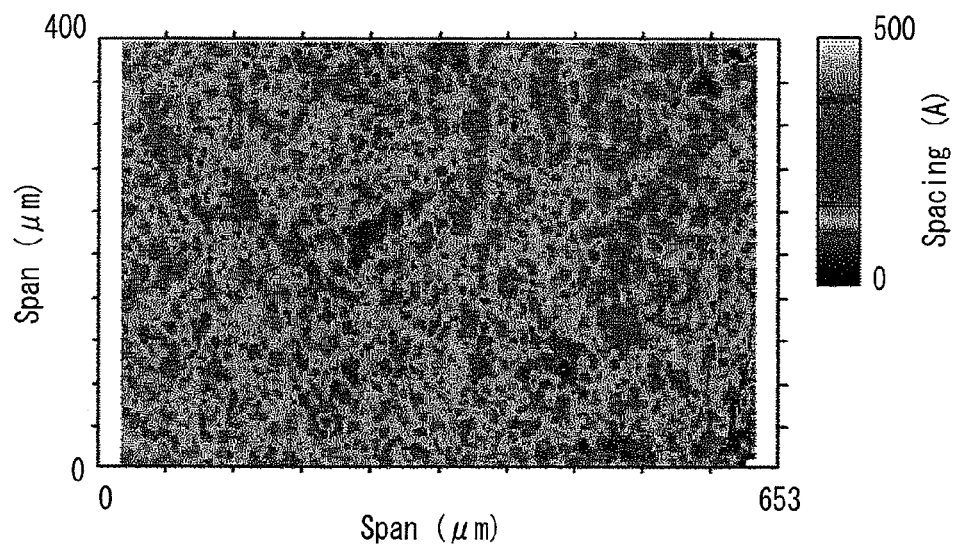
FIG. 3 is a planar image that shows a density representation of the spacing obtained by the spacing measurement apparatus shown in FIG. 2.

In this state, light of a specified wavelength emitted from a stroboscope 6 is irradiated to a specified region (240000 to 280000 μm$^2$) of the surface of the magnetic recording medium 100 on the magnetic layer 103 (see FIG. 1) side through an optical lens 9, a half mirror 11, an optical lens 10 and the glass plate 1, and the reflected light from the magnetic layer 103 was received by a CCD camera 8 through the optical lens 10, the half mirror 11 and the optical lens 12. The light received by the CCD camera 8 is converted into electrical signal by the controller 7, and the distance between the glass plate 1 and each point on the surface of the magnetic layer 103 (see FIG. 1) of the magnetic recording medium 100 is calculated from interference fringes generated by the irregularities in this region. An image showing a density representation of the calculated distances is displayed on a display portion 2. The image displayed on the display portion 2 was as shown in FIG. 3. FIG. 3 is a planar image showing a density representation of the spacing.

Figure 4:
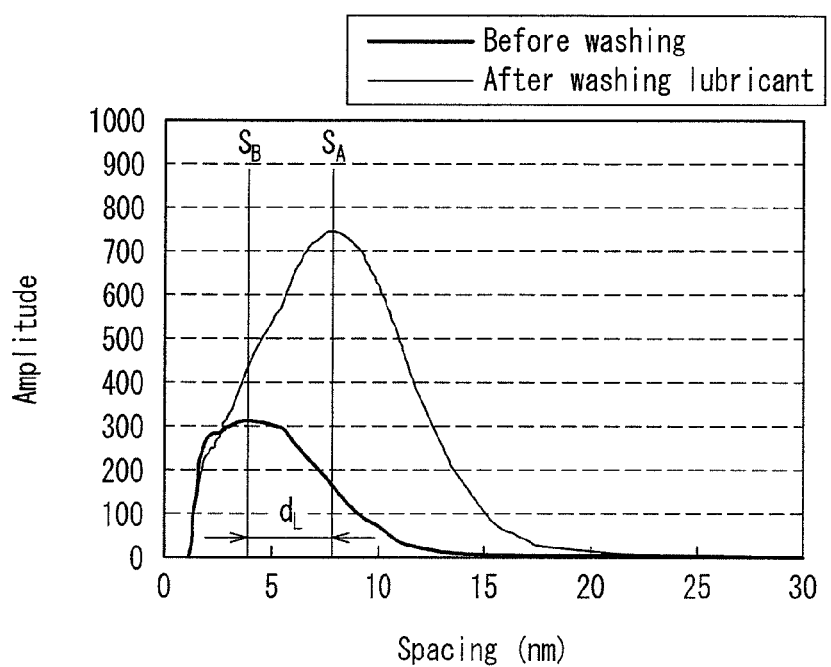
FIG. 4 shows a frequency distribution (a histogram) obtained from a density distribution of the spacing.

Furthermore, the image shown in FIG. 3 was divided into 66000 points, and at each point, the distance from the glass plate 1 to the surface of the magnetic layer 103 (see FIG. 1) was obtained. The obtained distances were plotted as a histogram (a frequency distribution curve), which, furthermore, was processed into a smooth curve by low-pass filter (LPF) processing, and thus a histogram shown in FIG. 4 was obtained. In FIG. 4, the horizontal axis represents spacing, and the vertical axis represents frequency. As long as the histogram is obtained by dividing the image into 50000 or more points, the number of divided points is not particularly important. The peak value of the histogram in FIG. 4 is regarded as the spacing between the glass plate 1 and the surface of the magnetic layer 103 (see FIG. 1) of the magnetic recording medium 100.

Moreover, FIG. 4 shows the histograms of the spacing before and after washing the magnetic recording medium 100 with n-hexane, and it can be seen from FIG. 4 that the values of the spacing are different before and after washing. In FIG. 4, when $S_A$ is the peak value of the spacing before washing, and $S_B$ is the peak value of the spacing after washing, the value of the difference $S_A-S_B$ between the peak values of the spacing before and after washing can be regarded as the thickness $d_L$ of the lubricant layer that is present on the magnetic layer 103 (see FIG. 1).

"Washing" as used herein refers to immersing the magnetic recording medium 100 in n-hexane and performing ultrasonic cleaning for 30 minutes. As a result, components that are soluble in n-hexane are extracted from the magnetic layer 103 (see FIG. 1), and the lubricant layer 105 (see FIG. 5 (described later)) on the surface of the magnetic layer 103 (see FIG. 1) also is washed away. Most of the components that are soluble in n-hexane and are extracted from the magnetic layer 103 is the lubricant contained in the magnetic layer 103 (see FIG. 1), and only a small part is a low molecular weight component of the binder contained in the magnetic layer 103 (see FIG. 1).

Figure 5:
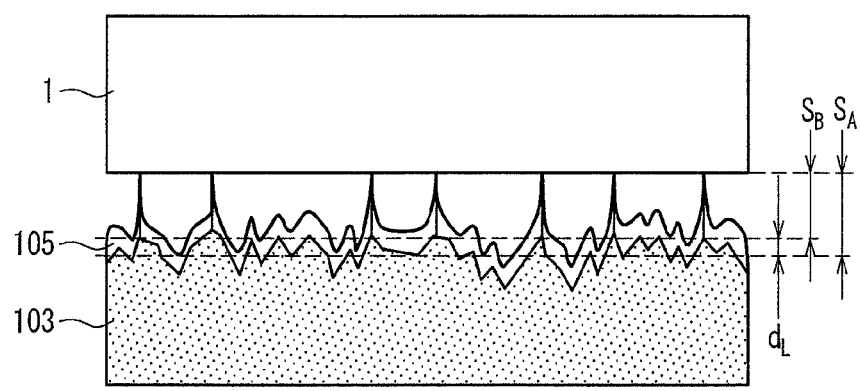
FIG. 5 is a conceptual illustration of the spacing between a magnetic head and a magnetic tape and a lubricant layer on the surface of a magnetic layer.

Based on the above-described data, the inventors of the present invention consider that the spacing between the glass plate 1, which is assumed as a magnetic head, and the magnetic recording medium 100 and the state of the lubricant layer 105 on the surface of the magnetic layer 103 (see FIG. 1) are as shown in the conceptual illustration in FIG. 5.

Furthermore, the inventors of the present invention conducted an in-depth research on the spacing, which is based on the surface profile of the magnetic layer 103 after elimination of the lubricant layer 105 (see FIG. 5), and the thickness of the lubricant layer 105, and found that it is possible to provide a magnetic recording medium having both superior recording/reproducing characteristics and superior transport characteristics by appropriately controlling the spacing and the thickness.

Conventionally, for example, in the case where the surface of the magnetic layer 103 was smoothed in order to improve the recording/reproducing characteristics, the degree of smoothness of the surface of the magnetic layer 103 was measured by, for example, an optical method such as those adopted by Zygo or a probe scanning method such as an AFM (Atomic Force Microscope). With the former method, due to the optical wavelength limit, it was not possible to capture minute protrusions having diameters on the order of several tens nm, which form the spacing, and therefore it was not possible to measure the microscopic surface profile. With the latter method, even though it is possible to capture minute protrusions, the measurement field of view, which is, for example, 10 μm×10 μm, is very narrow. Accordingly, in order to obtain an average spacing for an area corresponding to the contact area with the magnetic head, it was necessary to use an extremely increased number of measurement fields of view, and this was not practical in view of the effort and time required for measurements. Furthermore, since deformation of the minute protrusions due to the contact pressure applied by the magnetic head causes variations in actual spacing between the magnetic head and the surface of the magnetic layer 103, the actual spacing is not the same as the spacing estimated from the surface profile obtained using the above-described optical method or probe scanning method. The TSA performs spacing measurements in a state in which a contact pressure equal to the actual contact pressure is applied, and therefore, it is possible to obtain a value that is closer to the actual spacing between the magnetic head and the magnetic layer 103 than the spacing obtained by the optical method or the probe scanning method.

Thus, the inventors of the present invention found that the transport characteristics also are improved by obtaining the spacing between the magnetic head and the surface of the magnetic layer 103 from which the lubricant layer 105 (see FIG. 5) was eliminated, and providing a lubricant layer having an optimum thickness for the obtained spacing.

It is preferable that the spacing $S_A$ between the magnetic head and the magnetic layer 103 from which the lubricant layer 105 (see FIG. 5) has been eliminated is 3 to 10 nm. This range is preferable because a spacing of less than 3 nm will result in an excessively smooth surface and may cause the magnetic head and the magnetic layer 103 to stick together, and a spacing exceeding 10 nm will result in a large spacing, which in turn is likely to decrease the recording/reproducing characteristics. Preferably, the thickness $d_L$ of the lubricant layer 105 (see FIG. 5), which is defined as the difference $S_A-S_B$ between the spacing $S_A$ after washing the lubricant and the spacing $S_B$ before washing the lubricant, is 1 to 5 nm. This range is preferable because if the thickness is less than 1 nm, the effect, of the lubricant layer, of protecting the surface of the magnetic layer 103 and preventing wear may not be provided, and if the thickness exceeds 5 nm, the lubricant layer 105 (see FIG. 5) is excessively thick, and thus when performing transport repeatedly, the magnetic head and the magnetic tape may stick together, resulting in unstable transport.

There is no particular limitation to the method for controlling the values of $S_A$ and $d_L$ so as to fall within the above-described ranges, but, preferably, the following methods will be described as examples.

First, methods for controlling the value of $S_A$, in particular, controlling $S_A$ so as to be 10 nm or less will be described.

(1) The particle sizes and the particle size distributions of the powder materials constituting the magnetic layer 103 are controlled. The average particle size of the magnetic powder is preferably 35 nm or less and more preferably 25 nm or less. The average particle size of the non-magnetic powder having a Mohs' hardness of 6 or more is preferably 0.3 μm or less and more preferably 0.2 μm or less. The average particle size of the carbon black powder is preferably 100 nm or less and more preferably 50 nm or less. With regard to the particle size distributions of the above-described magnetic powder, non-magnetic powder, and carbon black, a sharp distribution is preferable.

(2) The degree of dispersion of the magnetic paint for forming the magnetic layer 103 is increased. A method for increasing the degree of dispersion is adopted in each step related to production of the magnetic paint. For example, surface treatment of the magnetic powder is performed before kneading the magnetic powder with the binder. It is also possible to perform surface treatment of the magnetic powder along with the other powder particles contained in the magnetic layer 103. The details of this method are disclosed in JP 2008-248238A.

(3) It is preferable to use a pressurized kneader to perform kneading. Moreover, in dilution and removal after kneading, it is preferable to use the kneader in combination with a twin-screw continuous kneader. The details of this method are disclosed in JP 2009-230779A.

(4) Preferably, sand mill dispersion after kneading and dilution is performed using a dispersing medium having a specific gravity of 3 or more and a particle size of 0.5 mm or less. For example, zirconia beads having a specific gravity of 6 and a particle size of 0.1 mm or less are preferably used. Moreover, in the case where dispersion using a sand mill is performed a plurality of times, it is preferable to perform a combination of dispersion using the sand mill and ultrasonic dispersion a plurality of times. The details of this method are disclosed in JP 2005-146187A.

(5) After sand mill dispersion, redispersion may be performed using a collision-type dispersing apparatus. By performing this process, the dispersion stability of the magnetic paint becomes excellent. The details of this method are disclosed in JP 2006-107627A. Moreover, $S_A$ can also be controlled by varying the timing of addition of the components other than the magnetic powder, such as the non-magnetic powder and the carbon black, or in other words, by dispersing such components from the beginning, that is, at the same time as the magnetic powder or by determining which of the above-described production steps of the magnetic paint mixing and dispersing of such components are performed in. It is also possible to previously disperse the non-magnetic powder and the carbon black as a separate paint and mix this paint in each of the production steps of the magnetic paint.

(6) The magnetic paint is applied to the upper surface side of the non-magnetic substrate 101 and is dried to form the magnetic layer 103, and then, a smoothing process is performed using a calender roller. The temperature and pressure of the calender roller at this time are controlled. It is preferable to set the surface roughness Ra of the calender roller to 2 nm or less. Moreover, by minimizing the time between the formation of the magnetic layer 103 and the smoothing process, the smooth magnetic layer 103 can be obtained.

(7) After cutting a magnetic sheet into pieces of a predetermined width, the magnetic layer 103 may be polished with a wrapping tape, a blade, a diamond wheel, or the like.

According to the present invention, the spacing $S_A$ of the magnetic layer 103 from which the lubricant layer 105 (see FIG. 5) has been eliminated can be controlled by using the methods described in (1) to (7) above alone or preferably by using some of these methods in combination.

Next, methods for controlling the value of $d_L$ will be described.

(8) The amounts of the lubricants, which are contained in the magnetic layer 103 and the non-magnetic layer 102, to be added are controlled, and the adding method is selected. In the high-capacity magnetic recording medium 100, the non-magnetic layer 102, which contains the non-magnetic powder, and the magnetic layer 103, which is the thin layer containing the magnetic powder, are formed on the upper surface of the non-magnetic substrate 101 in this order. In order to supply the lubricant to the surface of the magnetic layer 103, in addition to the magnetic layer 103, the non-magnetic layer 102 also contains the lubricant. The thickness $d_L$ of the lubricant layer formed on the surface of the magnetic layer 103 can be controlled by controlling the amounts of these lubricants.

(9) The amounts of the non-magnetic powder and the carbon black, which are contained in the magnetic layer 103 and the non-magnetic layer 102, to be added are controlled, and the adding method is selected. There are cases where the lubricant adsorbs to the non-magnetic powder or the carbon black, and becomes unlikely to seep out to the surface of the magnetic layer 103. Moreover, the amount of the lubricant that adsorbs varies depending on the mixing timing of the non-magnetic powder and the carbon black in the production processes of the magnetic paint and the non-magnetic paint.

(10) The surface of the magnetic layer 103 is topcoated with a lubricant. In the case where the amount of lubricant contained in the magnetic layer 103 or the non-magnetic layer 102 is small, the surface of the magnetic layer 103 may be topcoated with a lubricant to a predetermined thickness.

According to the present invention, the thickness $d_L$ of the lubricant layer formed on the surface of the magnetic layer 103 can be controlled by using the methods described in (8) to (10) above alone, or preferably by using some of these methods in combination.

Hereinafter, the present invention will be more specifically described by means of examples. However, the present invention is not limited to the examples below. It should be noted that in the following description, "part" means "part by mass".

Example 1

Preparation of Non-Magnetic Paint

A kneaded product was prepared by kneading non-magnetic paint components (1) listed in Table 1 using a batch-type kneader. The obtained kneaded product and non-magnetic paint components (2) listed in Table 2 were stirred with a stirrer to prepare a mixed solution. The obtained mixed solution was dispersed using a sand mill (residence time: 60 minutes) to prepare a dispersion solution, and afterward, the dispersion solution and non-magnetic paint components (3) listed in Table 3 were stirred with the stirrer, and the resulting solution was filtered through a filter to prepare a non-magnetic paint.

TABLE 1

| Non-magnetic paint components (1) | Part |
|---|---|
| Needle-like iron oxide (average particle size: 110 nm) | 68 |
| Carbon black (average particle size: 17 nm) | 20 |
| Granular alumina powder (average particle size: 120 nm) | 12 |
| Methyl acid phosphate | 1 |
| Vinyl chloride-hydroxypropyl acrylate copolymer (—$SO_3Na$ group content: $0.7 \times 10^{-4}$ equivalent/g) | 9 |
| Polyester polyurethane resin (glass-transition temperature: 40° C., —$SO_3Na$ group content: $1 \times 10^{-4}$ equivalent/g) | 5 |
| Tetrahydrofuran | 13 |
| Cyclohexanone | 63 |
| Methyl ethyl ketone | 137 |

TABLE 2

| Non-magnetic paint components (2) | Part |
|---|---|
| Stearic acid | 1 |
| Butyl stearate | 1.5 |
| Cyclohexanone | 50 |
| Methyl ethyl ketone | 50 |

TABLE 3

| Non-magnetic paint components (3) | Part |
|---|---|
| Polyisocyanate | 2.5 |
| Cyclohexanone | 9 |
| Toluene | 9 |

Preparation of Magnetic Paint

Magnetic paint components (1) listed in Table 4 were placed in a surface treatment vessel, stirred for 60 minutes using a rotary shearing type stirrer (CLEARMIX manufactured by M Technique Co., Ltd., rotor diameter: 50 mm, gap: 2 mm, number of revolutions: 2000 rpm, shear rate: $2.6 \times 10^4$/sec) to perform surface treatment of the magnetic powder and the alumina powder, and thus a first composition was obtained.

The obtained first composition was placed in a vertical type vibration dryer (VFD-01 manufactured by Chuo Kakohki Co., Ltd.) and concentrated by vibrating the inside of a vessel (frequency: 1800 cpm, amplitude: 2.2 mm) and heating to 60° C. under a reduced pressure of 20 kPa, and thus a second composition having a solid concentration of 90 wt % was obtained.

Magnetic paint components (2) listed in Table 5 were added to the obtained second composition, followed by kneading using a pressurized batch-type kneader.

Then, magnetic paint components (3) listed in Table 6 were added into the pressurized batch-type kneader in two steps to dilute the kneaded product, and thus a slurry was prepared. This slurry was dispersed using a sand mill (residence time 45 minutes) filled with zirconia beads (specific gravity: 6, particle size: 0.1 mm), and afterward, the obtained dispersion solution and magnetic paint components (4) listed in Table 7 were stirred with a stirrer, and the resulting solution was filtered through a filter to prepare a magnetic paint.

TABLE 4

| Magnetic paint components (1) | Part |
|---|---|
| Ferromagnetic ferrous metal magnetic powder (Fe) (additional elements: Co, Al, and Y) [Co/Fe: 24 at %, Al/(Fe + Co): 9.2 at %, Y/(Fe + Co): 11.8 at %, σs: 95 A·$m^2$/kg, Hc: 188 kA/m, average particle size: 35 nm, axial ratio: 3.8] | 100 |
| Polyester polyurethane resin (—$SO_3Na$ group content: $1 \times 10^{-4}$ equivalent/g) | 2 |
| Granular alumina powder (average particle size: 80 nm) | 10 |
| Methyl acid phosphate | 4 |
| Tetrahydrofuran | 271 |

TABLE 5

| Magnetic paint components (2) | Part |
|---|---|
| Vinyl chloride-hydroxypropyl acrylate copolymer (—$SO_3Na$ group content: $0.7 \times 10^{-4}$ equivalent/g) | 17 |
| Polyester polyurethane resin (glass-transition temperature: 40° C., —$SO_3Na$ group content: $1 \times 10^{-4}$ equivalent/g) | 4 |
| Methyl ethyl ketone | 5 |
| Cyclohexanone | 7 |
| Toluene | 5 |

TABLE 6

| Magnetic paint components (3) | Part |
|---|---|
| Palmitic acid amide | 4 |
| Cyclohexanone | 175 |
| Methyl ethyl ketone | 175 |

TABLE 7

| Magnetic paint components (4) | Part |
|---|---|
| Polyisocyanate | 1.5 |
| Cyclohexanone | 14.5 |
| Methyl ethyl ketone | 14.5 |

Preparation of Paint for Backcoat Layer

A mixed solution in which backcoat layer paint components listed in Table 8 were mixed was dispersed using a sand mill (residence time: 45 minutes). Then, 15 parts of polyisocyanate was added to the obtained dispersion solution and stirred, and the resulting solution was filtered through a filter to prepare a backcoat layer paint.

TABLE 8

| Backcoat layer paint components | Part |
|---|---|
| Carbon black (average particle size: 25 nm) | 87 |
| Carbon black (average particle size: 300 nm) | 10 |
| Granular alumina powder (average particle size: 80 nm) | 3 |
| Nitrocellulose | 45 |
| Polyurethane resin (containing —$SO_3Na$ group) | 30 |
| Cyclohexanone | 260 |

TABLE 8-continued

| Backcoat layer paint components | Part |
| --- | --- |
| Toluene | 260 |
| Methyl ethyl ketone | 525 |

Preparation of Paint for Topcoat Layer

Topcoat layer paint components listed in Table 9 were mixed and dissolved using a stirrer to prepare a topcoat layer paint.

TABLE 9

| Topcoat layer paint components | Part |
| --- | --- |
| Stearic acid | 1 |
| Butyl stearate | 1 |
| Isopropyl alcohol | 100 |

Production of Magnetic Tape for Evaluation

The above-described non-magnetic paint and magnetic paint were applied to one principal surface (the upper surface) of a non-magnetic substrate (a polyethylene naphthalate film, thickness: 6.1 μm) with an extrusion coater by a simultaneous dual coating method so that the thicknesses of the non-magnetic paint and the magnetic paint after drying and calender treatment were respectively 1.5 μm and 90 nm, and thus a non-magnetic layer and a magnetic layer were formed in this order. It should be noted that at this time, a process for providing in-plane orientation was performed while applying an orientation magnetic field (400 kA/m) using a solenoid magnet.

Next, the above-described backcoat layer paint was applied to the principal surface (the lower surface) of the non-magnetic substrate opposite to the principal surface (the upper surface) on which the non-magnetic layer and the magnetic layer were formed, in such a manner that the thickness after drying and calender treatment was 0.5 μm, and then the paint was dried to form a backcoat layer. The resulting raw fabric roll with the non-magnetic layer and the magnetic layer formed on the upper surface side of the non-magnetic substrate and the backcoat layer on the lower surface side was subjected to calender treatment using a calender having seven stages of metal rollers (temperature: 100° C., line pressure: 196 kN/m). Afterward, the topcoat layer paint shown in Table 9 was applied to the upper surface of the magnetic layer.

The resulting raw fabric roll was cured at 70° C. for 72 hours to produce a magnetic sheet. This magnetic sheet was cut into pieces of a width of ½ inches, and a servo signal conforming to the LTO standards was written, and thus a magnetic tape for evaluation was produced.

Example 2

After kneading, a part of the magnetic paint components (3) in Table 6 was added into the pressurized batch-type kneader and was diluted to a solid concentration of 50 wt %, and the resulting kneaded and diluted product was directed to a continuous twin-screw kneader. In the continuous twin-screw kneader, the balance of the magnetic paint components (3) was divided into three parts and added separately at three positions in an axial direction of the kneader for stepwise dilution, and thus a slurry was prepared. Otherwise, the same operation as in Example 1 was performed, and thus a magnetic tape for evaluation was produced.

Example 3

A magnetic tape for evaluation was produced in the same manner as in Example 2 except that redispersion was performed by using a collision type dispersing apparatus and passing the magnetic paint obtained by filtering with the filter through a collision chamber twice with an orifice diameter of 0.2 mm and a pressurizing condition of 150 MPa to prepare a magnetic paint, and the calender treatment was performed twice.

Example 4

A magnetic tape for evaluation was produced in the same manner as in Example 3 except that topcoating was not performed.

Comparative Example 1

A magnetic tape for evaluation was produced in the same manner as in Example 1 except that surface treatment and concentration of the magnetic powder and the alumina powder were not performed, the amount of tetrahydrofuran of the magnetic paint components (1) was changed to 12.9 parts by mass, and the changed magnetic paint components (1) were added to the magnetic paint components (2) and kneaded using the pressurized batch-type kneader to prepare a magnetic paint.

Comparative Example 2

Alumina paint components listed in Table 10 were mixed and stirred, and then dispersed for a residence time of 60 minutes using a sand mill whose stirring shaft and container inner surface were covered with ceramic, and thus an alumina paint was prepared.

A magnetic tape for evaluation was produced in the same manner as in Example 2 except that the 10 parts by mass of granular alumina powder (average particle size: 80 nm) of the magnetic paint components (1) was not used, and 46 parts by mass of the above-described alumina paint was added in the course of dispersion of the magnetic paint using the sand mill (at 22 minutes of residence time) to prepare a magnetic paint.

TABLE 10

| Alumina paint components | Part |
| --- | --- |
| Granular alumina powder (average particle size: 80 nm) | 100 |
| Vinyl chloride-hydroxypropyl acrylate copolymer (—$SO_3Na$ group content: $0.7 \times 10^{-4}$ equivalent/g) | 10 |
| Methyl ethyl ketone | 350 |

Comparative Example 3

A magnetic tape for evaluation was produced in the same manner as in Example 2 except that the magnetic powder of the magnetic paint components (1) was changed to a ferromagnetic ferrous metal magnetic powder ((additional elements: Co, Al, and Y) [Co/Fe: 24 at %, Al/(Fe+Co): 4.7 at %, Y/(Fe+Co): 7.9 at %, σs 116 A·m²/kg, Hc: 165 kA/m, average particle size: 45 nm, axial ratio: 4]) to prepare a magnetic paint.

Comparative Example 4

A magnetic tape for evaluation was produced in the same manner as in Example 2 except that the amount of stearic acid of the non-magnetic paint components (2) was changed to 0.7 parts by mass, the amount of butyl stearate was changed to 0.7 parts by mass, and topcoating was not performed.

Example 5

A magnetic tape for evaluation was produced in the same manner as in Example 1 except that the magnetic powder of the magnetic paint components (1) was changed to a barium ferrite magnetic powder (Ba—Fe) (σs: 50 A·m²/kg (50 emu/g), Hc: 159 kA/m (2000 Oe), average particle size (plate diameter): 20 nm) and the amount of granular alumina powder (average particle size: 80 nm) was changed to 5 parts by mass to prepare a magnetic paint, and the application of the orientation magnetic field (400 kA/m) using a solenoid magnet was not performed.

Example 6

A magnetic tape for evaluation was produced in the same manner as in Example 3 except that the magnetic powder of the magnetic paint components (1) was changed to a barium ferrite magnetic powder (Ba—Fe) (σs: 50 A·m²/kg (50 emu/g), Hc: 159 kA/m (2000 Oe), average particle size (plate diameter): 20 nm) and the amount of granular alumina powder (average particle size: 80 nm) was changed to 5 parts by mass to prepare a magnetic paint, and the application of the orientation magnetic field (400 kA/m) using a solenoid magnet was not performed.

Example 7

A magnetic tape for evaluation was produced in the same manner as in Example 6 except that the line pressure of the calender treatment was changed to 392 kN/m.

Example 8

A magnetic tape for evaluation was produced in the same manner as in Example 6 except that after writing of the servo signal, polishing treatment was performed in which the surface of the magnetic layer was polished using a #20000 wrapping tape manufactured by Nihon Micro Coating Co., Ltd. and thereafter contaminants on the surface were removed with a cleaning tissue.

Example 9

A magnetic tape for evaluation was produced in the same manner as in Example 8 except that the magnetic powder of the magnetic paint components (1) was changed to a barium ferrite magnetic powder (Ba—Fe) (as: 50 A·m²/kg (50 emu/g), Hc: 159 kA/m (2000 Oe), average particle size (plate diameter): 20 nm), the 10 parts by mass of granular alumina powder (average particle size: 80 nm) was not used, and 23 parts by mass of an alumina paint as used in Comparative Example 2 was added in the course of dispersion of the magnetic paint using the sand mill (at 22 minutes of residence time) to prepare a magnetic paint.

Comparative Example 5

A magnetic tape for evaluation was produced in the same manner as in Example 1 except that the magnetic powder of the magnetic paint components (1) was changed to a barium ferrite magnetic powder (Ba—Fe) (σs: 50 A·m²/kg (50 emu/g), Hc: 159 kA/m (2000 Oe), average particle size (plate diameter): 20 nm), the amount of the granular alumina powder (average particle size: 80 nm) was changed to 5 parts by mass, the amount of tetrahydrofuran was changed to 12.9 parts by mass, and the changed magnetic paint components (1) were added to the magnetic paint components (2), followed by kneading using the pressurized batch-type kneader, without performing surface treatment and concentration of the magnetic powder and the alumina powder, to prepare a magnetic paint; and the application of the orientation magnetic field (400 kA/m) using a solenoid magnet was not performed.

Comparative Example 6

A magnetic tape for evaluation was produced in the same manner as in Example 5 except that topcoating was performed with the amount of stearic acid of the topcoat layer paint components changed to 2 parts by mass and the amount of butyl stearate changed to 2 parts by mass.

Comparative Example 7

A magnetic tape for evaluation was produced in the same manner as in Example 5 except that the amount of stearic acid of the non-magnetic paint components (2) was changed to 0.7 parts by mass, the amount of butyl stearate was changed to 0.7 parts by mass, and topcoating was not performed.

Example 10

A magnetic tape for evaluation was produced in the same manner as in Example 1 except that the magnetic powder of the magnetic paint components (1) was changed to an iron nitride magnetic powder (Y—N—Fe) (Y/Fe: 5.5 at %, N/Fe: 11.9 at %, σs: 103 A·m²/kg (103 emu/g), He: 211.0 kA/m (2650 Oe), average particle size: 17 nm, axial ratio: 1.1) and the amount of granular alumina powder (average particle size: 80 nm) was changed to 5 parts by mass to prepare a magnetic paint, and the application of the orientation magnetic field (400 kA/m) using a solenoid magnet was not performed.

Example 11

A magnetic tape for evaluation was produced in the same manner as in Example 3 except that the magnetic powder of the magnetic paint components (1) was changed to an iron nitride magnetic powder (Y—N—Fe)(Y/Fe: 5.5 at %, N/Fe: 11.9 at %, σs: 103 A·m²/kg (103 emu/g), He: 211.0 kA/m (2650 Oe), average particle size: 17 nm, axial ratio: 1.1) and the amount of granular alumina powder (average particle size: 80 nm) was changed to 5 parts by mass to prepare a magnetic paint, and the application of the orientation magnetic field (400 kA/m) using a solenoid magnet was not performed.

Example 12

A magnetic tape for evaluation was produced in the same manner as in Example 11 except that the line pressure of the calender treatment was changed to 392 kN/m.

Example 13

A magnetic tape for evaluation was produced in the same manner as in Example 11 except that after writing the servo signal, polishing treatment was performed in which the surface of the magnetic layer was polished using a #20000 wrapping tape manufactured by Nihon Micro Coating Co., Ltd. and thereafter contaminants on the surface was removed with a cleaning tissue.

Example 14

A magnetic tape for evaluation was produced in the same manner as in Example 13 except that the magnetic powder of the magnetic paint components (1) was changed to an iron nitride magnetic powder (Y—N—Fe) (Y/Fe: 5.5 at %, N/Fe: 11.9 at %, σs: 103 A·m²/kg (103 emu/g), Hc: 211.0 kA/m (2650 Oe), average particle size: 17 nm, axial ratio: 1.1), the 10 parts by mass of granular alumina powder (average particle size: 80 nm) was not used, and 23 parts by mass of an alumina paint as used in Comparative Example 2 was added in the course of dispersion of the magnetic paint using the sand mill (at 22 minutes of residence time) to prepare a magnetic paint.

Comparative Example 8

A magnetic tape for evaluation was produced in the same manner as in Example 1 except that the magnetic powder of the magnetic paint components (1) was changed to an iron nitride magnetic powder (Y—N—Fe) (Y/Fe: 5.5 at %, N/Fe: 11.9 at %, σs: 103 A·m²/kg (103 emu/g), Hc: 211.0 kA/m (2650 Oe), average particle size: 17 nm, axial ratio: 1.1), the amount of granular alumina powder (average particle size: 80 nm) was changed to 5 parts by mass, the amount of tetrahydrofuran was changed to 12.9 parts by mass, and the changed magnetic paint components (1) were added to the magnetic paint components (2), followed by kneading using the pressurized batch-type kneader, without performing surface treatment and concentration of the magnetic powder and the alumina powder, to prepare a magnetic paint; and the application of the orientation magnetic field (400 kA/m) using a solenoid magnet was not performed.

Comparative Example 9

A magnetic tape for evaluation was produced in the same manner as in Example 10 except that topcoating was performed with the amount of stearic acid of the topcoat layer paint components changed to 2 parts by mass and the amount of butyl stearate changed to 2 parts by mass.

Comparative Example 10

A magnetic tape for evaluation was produced in the same manner as in Example 10 except that the amount of stearic acid of the non-magnetic paint components (2) was changed to 0.7 parts by mass, the amount of butyl stearate was changed to 0.7 parts by mass, and topcoating was not performed.

The following evaluations were performed using the tapes of Examples 1 to 14 and Comparative Examples 1 to 10. Tables 11 to 13 show the results of these evaluations.

Measurement of Surface Roughness of Magnetic Layer

The surface of the magnetic layer of a magnetic sheet for evaluation was measured using a general-purpose three-dimensional surface structure analyzer (New View 5000 manufactured by Zygo Corporation) by scanning white light interferometry (scan length: 5 μm, measurement field of view: 72 μm×54 μm, object lens magnification: 50×, zoom: 2×), and the surface roughness Ra was obtained from an average of the values measured at ten positions.

Measurement of Spacing of Magnetic Layer

The spacing before and after washing the lubricant with n-hexane was measured using the TSA (Tape Spacing Analyzer (manufactured by MicroPhysics, Inc.)) shown in FIG. 2, and the value of $S_A-S_B$, where $S_A$ is the value of the spacing after washing the lubricant and $S_B$ is the value of the spacing before washing the lubricant, was obtained as the thickness $d_L$ of the lubricant layer.

The pressure at which the hemisphere 3 made of urethane presses the magnetic layer 103 against the glass plate 1 was set to 0.5 atm ($5.05 \times 10^4$ N/m²). In this state, white light emitted from the stroboscope 6 was irradiated to a specified region (240000 to 280000 μm²) of the surface of the magnetic recording medium 100 on the magnetic layer 103 side through the optical lens 9, the half mirror 11, the optical lens 10 and the glass plate 1, and the reflected light from the magnetic layer 103 was received by the CCD camera 8 through the optical lens 10, the half mirror 11, the optical lens 12 and an IF filter (633 nm). The light received by the CCD camera 8 was converted into electrical signal by the controller 7, and thus an interference fringe image generated by the irregularities in this region was obtained.

This image was divided into 66000 points, and at each point, the distance from the glass plate 1 to the surface of the magnetic layer 103 was obtained. The obtained distances were plotted as a histogram (a frequency distribution curve), which was further processed into a smooth curve by low-pass filter (LPF) processing, and the distance from the glass plate 1 to the surface of the magnetic layer 103 at the peak position was determined as the spacing.

Washing of the lubricant with n-hexane was performed by immersing the magnetic tape in n-hexane and performing ultrasonic cleaning for 30 minutes at room temperature.

S/N Measurement

An apparatus, manufactured by Hitachi Maxell, Ltd., for measuring electromagnetic conversion characteristics of linear tapes was used. A head of an LTO4 drive manufactured by Hewlett-Packard was attached to this apparatus, and a signal of a recording wavelength of 270 nm was recorded on the magnetic tape at a tape speed of 1.5 m/sec. The reproduced signal was amplified with a commercially available Read amplifier for MR heads, and then, a fundamental wave component output (S) and integrated noise (N) of the signal were measured using a spectrum analyzer N9020A manufactured by Agilent Technologies, Inc. The S/N of Comparative Example 1 was taken as a reference (0 dB), and a relative value was obtained for evaluation.

Sticking of Magnetic Head and Magnetic Tape

A linear tape transport test apparatus manufactured by Hitachi Maxell, Ltd. was used. A driving current of a motor for driving so as to transport the magnetic tape was monitored, and if a predetermined current value was exceeded, it was determined that sticking occurred. 10000 passes of transport was performed in an environment at 29° C. and 80% RH, and a case where sticking did not occur in these passes was evaluated as "A", a case where sticking occurred 1 to 5 times was evaluated as "B", and a case where sticking occurred 6 or more times was evaluated as "C".

Defect in Tape

After 20000 passes of transport in an environment at 20° C. and 20% RH using an LTO4 drive manufactured by Hewlett-Packard, the surface of the tape was observed under a differential interference optical microscope with a magnification of 200× (field of view: 880 μm×710 μm). A case where there was no defect was evaluated as "A", a case where there were 1 to 5 defects per 1 cm² was evaluated as "B", and a case where there were 6 or more defects was evaluated as "C".

TABLE 11

|  |  | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|---|
| Magnetic layer | Magnetic powder | Fe | Fe | Fe | Fe | Fe | Fe | Fe | Fe |
|  | Size (nm) | 35 | 35 | 35 | 35 | 35 | 35 | 45 | 35 |
|  | Alumina (part) | 10 | 10 | 10 | 10 | 10 | 10 (after) | 10 | 10 |
| Non-magnetic layer | $S_A$ (part) | 1 | 1 | 1 | 1 | 1 | 1 | 1 | 0.7 |
|  | $S_B$ (part) | 1.5 | 1.5 | 1.5 | 1.5 | 1.5 | 1.5 | 1.5 | 0.7 |
| Dispersion | Surface treatment | Yes | Yes | Yes | Yes | No | Yes | Yes | Yes |
|  | Twin-screw kneader | No | Yes | Yes | Yes | No | Yes | Yes | Yes |
|  | Redispersion | No | No | Yes | Yes | No | No | No | No |
| Calender | Pressure (kN/m) | 196 | 196 | 196 | 196 | 196 | 196 | 196 | 196 |
|  | Number of times (times) | 1 | 1 | 2 | 2 | 1 | 1 | 1 | 1 |
| Topcoat | $S_A/S_B$ (part/part) | 1/1 | 1/1 | 1/1 | No | 1/1 | 1/1 | 1/1 | No |
| Post treatment | Polishing treatment | No | No | No | No | No | No | No | No |
| Evaluation | Ra (nm) | 1.8 | 1.9 | 1.8 | 1.8 | 1.9 | 1.8 | 1.9 | 1.9 |
|  | $S_A$ (nm) | 10 | 8 | 6 | 6 | 12 | 8 | 10 | 8 |
|  | $d_L$ (nm) | 4 | 4 | 5 | 2 | 4 | 6 | 5 | 0 |
|  | S/N (dB) | 0.6 | 1.1 | 1.7 | 1.8 | 0.0 | 1.2 | 2.0 | 1.3 |
|  | Sticking | A | A | B | A | A | C | A | A |
|  | Defect in tape | A | A | A | B | A | A | A | C |

TABLE 12

|  |  | Ex. 5 | Ex. 6 | Ex. 7 | Ex. 8 | Ex. 9 | Com. Ex. 5 | Com. Ex. 6 | Com. Ex. 7 |
|---|---|---|---|---|---|---|---|---|---|
| Magnetic layer | Magnetic powder | Ba—Fe | Ba—Fe | Ba—Fe | Ba—Fe | Ba—Fe | Ba—Fe | Ba—Fe | Ba—Fe |
|  | Size (nm) | 20 | 20 | 20 | 20 | 20 | 20 | 20 | 20 |
|  | Alumina (part) | 5 | 5 | 5 | 5 | 5 (after) | 5 | 5 | 5 |
| Non-magnetic layer | $S_A$ (part) | 1 | 1 | 1 | 1 | 1 | 1 | 1 | 0.7 |
|  | $S_B$ (part) | 1.5 | 1.5 | 1.5 | 1.5 | 1.5 | 1.5 | 1.5 | 0.7 |
| Dispersion | Surface treatment | Yes | Yes | Yes | Yes | Yes | No | Yes | Yes |
|  | Twin-screw kneader | No | Yes | Yes | Yes | Yes | No | No | No |
|  | Redispersion | No | Yes | Yes | Yes | Yes | No | No | No |
| Calender | Pressure (kN/m) | 196 | 196 | 392 | 196 | 196 | 196 | 196 | 196 |
|  | Number of times (times) | 1 | 2 | 2 | 2 | 2 | 1 | 1 | 1 |
| Topcoat | $S_A/S_B$ (part/part) | 1/1 | 1/1 | 1/1 | 1/1 | 1/1 | 1/1 | 2/2 | No |
| Post treatment | Polishing treatment | No | No | No | Yes | Yes | No | No | No |
| Evaluation | Ra (nm) | 1.8 | 1.8 | 1.8 | 1.8 | 1.8 | 1.9 | 1.8 | 1.8 |
|  | $S_A$ (nm) | 6 | 4 | 3 | 3 | 4 | 12 | 6 | 6 |
|  | $d_L$ (nm) | 3 | 3 | 3 | 1 | 3 | 3 | 6 | 0 |
|  | S/N (dB) | 1.9 | 2.5 | 2.8 | 2.7 | 2.4 | 0.0 | 1.8 | 1.7 |
|  | Sticking | A | B | B | B | B | A | C | A |
|  | Defect in tape | A | A | A | B | A | A | A | C |

TABLE 13

|  |  | Ex. 10 | Ex. 11 | Ex. 12 | Ex. 13 | Ex. 14 | Com. Ex. 8 | Com. Ex. 9 | Com. Ex. 10 |
|---|---|---|---|---|---|---|---|---|---|
| Magnetic layer | Magnetic powder | Iron nitride | Iron nitride | Iron nitride | Iron nitride | Iron nitride | Iron nitride | Iron nitride | Iron nitride |
|  | Size (nm) | 17 | 17 | 17 | 17 | 17 | 17 | 17 | 17 |
|  | Alumina (part) | 5 | 5 | 5 | 5 | 5 (after) | 5 | 5 | 5 |
| Non-magnetic layer | $S_A$ (part) | 1 | 1 | 1 | 1 | 1 | 1 | 1 | 0.7 |
|  | $S_B$ (part) | 1.5 | 1.5 | 1.5 | 1.5 | 1.5 | 1.5 | 1.5 | 0.7 |
| Dispersion | Surface treatment | Yes | Yes | Yes | Yes | Yes | No | Yes | Yes |
|  | Twin-screw kneader | No | Yes | Yes | Yes | Yes | No | No | No |
|  | Redispersion | No | Yes | Yes | Yes | Yes | No | No | No |
| Calender | Pressure (kN/m) | 196 | 196 | 392 | 196 | 196 | 196 | 196 | 196 |
|  | Number of times (times) | 1 | 2 | 2 | 2 | 2 | 1 | 1 | 1 |
| Topcoat | $S_A/S_B$ (part/part) | 1/1 | 1/1 | 1/1 | 1/1 | 1/1 | 1/1 | 2/2 | No |
| Post treatment | Polishing treatment | No | No | No | Yes | Yes | No | No | No |
| Evaluation | Ra (nm) | 1.8 | 1.8 | 1.8 | 1.8 | 1.8 | 1.9 | 1.8 | 1.8 |
|  | $S_A$ (nm) | 6 | 4 | 3 | 3 | 4 | 11 | 6 | 6 |
|  | $d_L$ (nm) | 4 | 4 | 3 | 2 | 4 | 4 | 6 | 0 |
|  | S/N (dB) | 1.5 | 2.0 | 2.5 | 2.4 | 2.1 | 0.0 | 1.4 | 1.5 |
|  | Sticking | A | B | B | B | B | A | C | A |
|  | Defect in tape | A | A | A | B | A | A | A | C |

As is apparent from Tables 11 to 13, Examples 1 to 14 showed a good S/N, seldom caused sticking, and had no or few defects in tape, whereas Comparative Examples 1 to 10 were poor in terms of any of the S/N, sticking, and defects in tape.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic recording medium comprising a non-magnetic substrate; a non-magnetic layer that is formed on one of principal surfaces of the non-magnetic substrate and contains a non-magnetic powder, a binder, and a lubricant; and a magnetic layer that is formed on a principal surface of the non-magnetic layer opposite to the non-magnetic substrate and contains a magnetic powder and a binder,
wherein the magnetic powder is either a platy hexagonal ferrite magnetic powder or a spherical iron nitride magnetic powder,
the magnetic layer has a thickness of 10 to 150 nm,
the magnetic layer has a surface roughness of 1 nm or more and less than 2 nm,
the magnetic powder has an average particle size between 10 nm and 25 nm inclusive,
a lubricant layer is formed on a surface of the magnetic layer, and
when spacing of the surface of the magnetic layer before and after washing the magnetic recording medium with n-hexane is measured with a TSA (Tape Spacing Analyzer) while pressurizing the surface of the magnetic recording medium under a pressing pressure of 0.5 atm, the value of the spacing before washing is 1 to 5 nm smaller than the value of 5 to 10 nm of the spacing after washing.

2. The magnetic recording medium according to claim 1, wherein the TSA disposes a transparent body in contact with and opposing the surface of the magnetic layer, irradiates the transparent body side of the magnetic layer with light through the transparent body, and calculates spacing between the magnetic layer and the transparent body based on an intensity of coherent light that is generated in a portion where the surface of the magnetic layer and the transparent body are opposing each other.

3. The magnetic recording medium according to claim 1, wherein the non-magnetic powder contained in the non-magnetic layer has an average particle size of 10 to 1000 nm.

4. The magnetic recording medium according to claim 1, wherein the lubricant contained in the non-magnetic layer comprises a fatty acid having 10 to 30 carbon atoms.

5. The magnetic recording medium according to claim 4, wherein the fatty acid comprises at least one selected from a group consisting of lauric acid, myristic acid, stearic acid, palmitic acid, behenic acid, oleic acid, and linoleic acid.

6. The magnetic recording medium according to claim 4, wherein the content of the fatty acid in the non-magnetic layer is 0.2 to 5 parts by mass with respect to 100 parts by mass of the non-magnetic powder.

7. The magnetic recording medium according to claim 4, wherein the lubricant contained in the non-magnetic layer further comprises at least one of a fatty acid ester and a fatty acid amide.

8. The magnetic recording medium according to claim 7, wherein the combined content of the fatty acid ester and the fatty acid amide in the non-magnetic layer is 0.2 to 10 parts by mass with respect to 100 parts by mass of the non-magnetic powder.

9. The magnetic recording medium according to claim 1, wherein the non-magnetic layer has a thickness of 0.1 to 3 μm.

10. The magnetic recording medium according to claim 1, wherein the magnetic layer further contains, as a lubricant, 0.2 to 3 parts by mass of a fatty acid ester with respect to a total amount of all the powders in the magnetic layer and 0.5 to 5 parts by mass of a fatty acid amide with respect to the total amount of all the powders in the magnetic layer.

11. The magnetic recording medium according to claim 1, wherein the non-magnetic substrate has a thickness of 1.5 to 11 µm.

12. The magnetic recording medium according to claim 1, further comprising a backcoat layer that is formed on the principal surface of the non-magnetic substrate opposite to the non-magnetic layer.

13. The magnetic recording medium according to claim 1, wherein the non-magnetic powder comprises a needle-like or spindle-like non-magnetic powder, and the average minor axis diameter of the needle-like or spindle-like non-magnetic powder is preferably 5 to 200 nm.

\* \* \* \* \*